United States Patent [19]

Meeks

[11] Patent Number: 4,604,777
[45] Date of Patent: Aug. 12, 1986

[54] SPRING RETAINERS

[75] Inventor: Alan M. G. Meeks, Chineham, England

[73] Assignee: ITW Limited, Windsor, England

[21] Appl. No.: 534,880

[22] Filed: Sep. 22, 1983

[51] Int. Cl.⁴ .............................................. A47C 1/02
[52] U.S. Cl. ..................................... 24/665; 297/410
[58] Field of Search ............... 297/391, 410, 414, 216; 24/633, 664, 665

[56] References Cited

U.S. PATENT DOCUMENTS

| | | | |
|---|---|---|---|
| 2,613,731 | 10/1952 | Roginski | 297/410 |
| 3,512,832 | 5/1970 | Kage | 297/410 |
| 3,578,384 | 5/1971 | Leichtl | 297/410 |
| 4,398,323 | 8/1983 | Beard | 24/633 |
| 4,411,470 | 10/1983 | Nishimura et al. | 297/410 |
| 4,427,233 | 1/1984 | Matumoto | 297/410 X |
| 4,478,456 | 10/1984 | Mitsui | 297/410 |
| 4,483,565 | 11/1984 | Terui et al. | 297/410 |

FOREIGN PATENT DOCUMENTS 48206 2/1980 Fed. Rep. of Germany ...... 297/410

Primary Examiner—William E. Lyddane
Assistant Examiner—Peter A. Aschenbrenner
Attorney, Agent, or Firm—Trexler, Bushnell & Wolters, Ltd.

[57] ABSTRACT

A spring retainer 10 comprises a housing 12, a spring 14 and an actuator 16.

The housing 12 is formed with a bore 20 and an opening 22 which extends transversely of and intersects the bore 20. The actuator 16 is snap engaged with the housing 12 to retain the spring 14 within the opening 22. At least a part of the actuator 16, such as arm 30, is movable inwardly and outwardly of the opening 22 to alter the extent to which the spring 14 obstructs the bore 20.

The spring retainer 10 finds particular application in allowing removal or adjustment of head rests on vehicle seat backs. The arm 30 can be readily squeezed, even when shielded by padded upholstery on the vehicle seat back, to release the spring 14 from a spigot extending downwardly from the head rest.

5 Claims, 11 Drawing Figures

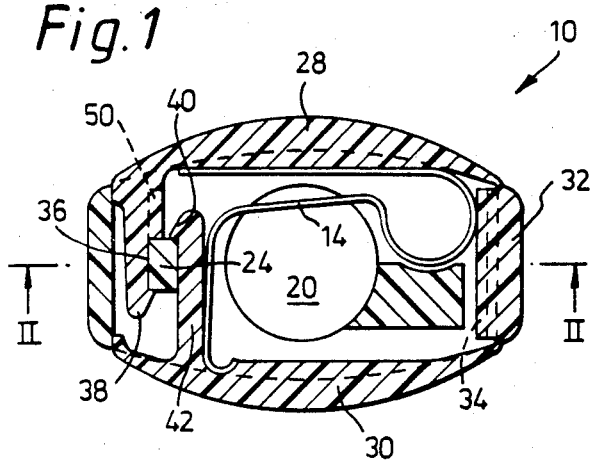
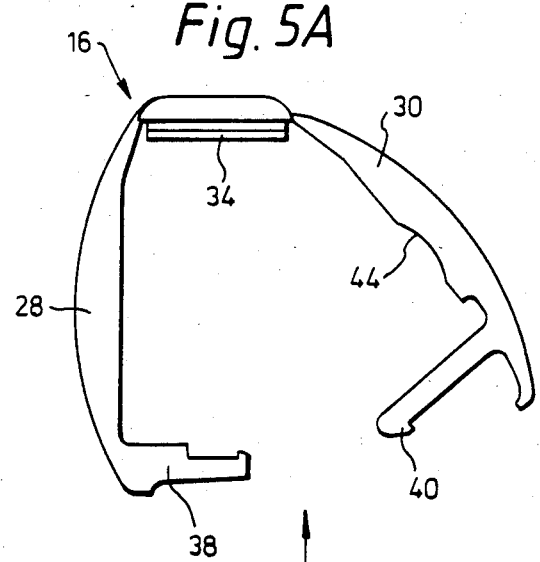
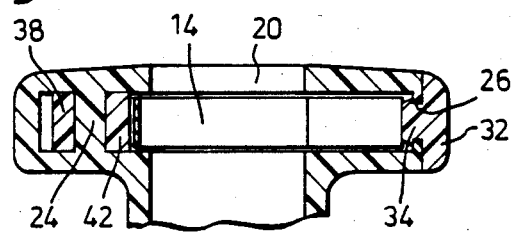
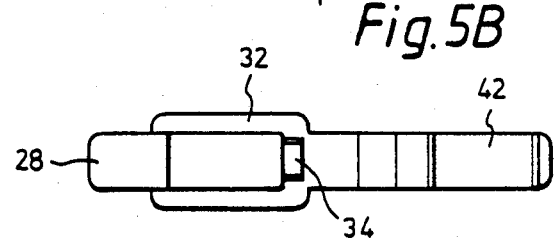
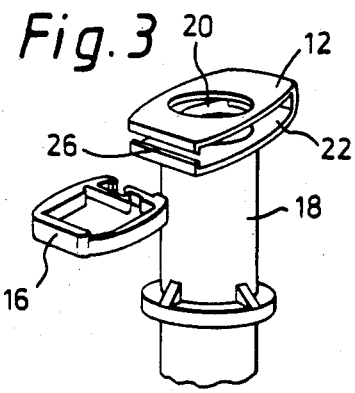
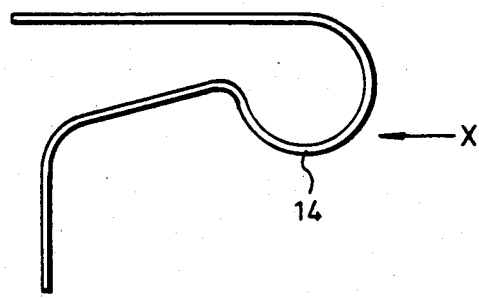
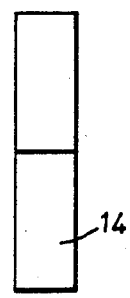

SPRING RETAINERS

The present invention relates to spring retainers, and particularly concerns spring retainers for use in allowing removal or adjustment of head rests on vehicle seat backs, although spring retainers for use in many other applications are envisaged.

Typically, a head rest includes one or more downwardly extending spigots which are longitudinally slidable in one or more upwardly opening sockets formed in a vehicle seat back. A spring retainer may be mounted to the vehicle seat back at the mouth of the or each socket, the retainer being manually operable to move a spring into and out of engagement with the spigot, thereby respectively resisting and facilitating sliding movement of the spigot in the socket. Each spigot is usually in the form of a rod or tube against which the spring is usually resiliently biased. The friction between the spring and the spigot should be sufficient to hold the head rest in position, during normal usage, but not sufficient to prevent desired sliding of the head rest relatively to the vehicle seat back. A notch may be formed in the spigot for preventing complete removal of the head rest until the spring retainer has been positively manipulated to withdraw the spring from the notch. Indeed, there may be a series of notches along the length of the spigot corresponding to a series of preselected positions of vertical adjustment for the head rest.

A problem with the known spring retainers has been that they are operable by rotation, yet are tightly pressed against padded upholstery on the vehicle seat backs, with the result that it has been difficult to grip and overcome the strong frictional resistance to turning caused by the presence of the padded upholstery.

Another problem has been that, because of the particular constructional details of the known spring retainers, it has been necessary to compress the springs during assembly, which is either awkward and time-consuming if performed by hand, or requires expensive and complicated machinery if performed automatically.

The aim has been to overcome these problems.

In accordance with one aspect of the present invention, a spring retainer comprises a housing, a spring and an actuator, the housing being formed with a bore and with an opening which extends transversely of and intersects the bore, and the actuator being snap engaged with the housing to retain the spring within the opening, at least a part of the actuator being movable inwardly and outwardly of the opening to alter the extent to which the spring obstructs the bore.

In accordance with another aspect of the present invention, a method of assembling a spring retainer comprises taking a housing formed with a bore and with an opening which extends transversely of and intersects the bore, locating a spring in its natural uncompressed state within the opening, and then snap-engaging an actuator with the housing to retain the spring within the opening, at least a part of the actuator then being movable inwardly and outwardly of the opening to alter the extent to which the spring obstructs the bore.

Preferably, the housing is formed in one piece of a plastics material, the spring is formed as a pre-shaped metal strip, and the actuator is again formed in one piece of a plastics material.

The housing may be formed at the upper end of a tube-like socket member provided with standard mounting means for fixing to the framework of a vehicle seat back. The opening may extend completely across the housing and open to opposed sides of the housing. If the housing is of barrel shape when viewed from above, the opening may extend between and open to the longer curved sides of the barrel shape.

The spring may be positioned so that it lies on one edge within the opening.

The actuator may have first and second arms joined at adjacent ends thereof by a bridge. The first arm may have a tongue at or near its other end with the tongue being formed with means such as a recess for permitting snap-engagement with further means such as a post forming part of the housing. The second arm may have a latch at or near its other end with the latch being formed with means such as a stop for resisting release of the actuator from the housing. The stop may in fact be usually engaged with the post with which the recess in the tongue is snap-engaged.

In the usual condition, end portions of the spring abut the first and second arms, respectively, and an intermediate portion of the spring lies across, and thus obstructs, the bore.

Grasping and squeezing the two arms causes the second arm to pivot about its connection with the bridge. This, in turn, causes the stop to move out of engagement with the post, and the spring to be compressed to a position in which it does not obstruct the bore. Releasing the two arms allows the spring to expand and return to its above-described usual condition.

Preferably, the bridge is itself capable of snap-engagement with the housing. For example, the bridge may be formed with an inwardly projecting headed strip. The housing may be formed with a complementary groove, or even a slot which communicates with the opening in the housing.

That part of the actuator which is movable to alter the extent to which the spring obstructs the bore may normally be substantially shielded by the housing, or protrude from the housing, or lie substantially outside the housing, whereby in actuation said part of the actuator moves more and less deeply within the opening, or into and out of the opening, or towards and away from the opening, all these situations being envisaged in use of the expression "movable inwardly and outwardly of the opening".

Two spring retainers, and a method of assembling the spring retainers, in accordance with the present invention, will now be described, by way of example only, with reference to the accompanying drawings, in which:

FIG. 1 is a sectional view through the first spring retainer;

FIG. 2 is a sectional view taken along the line II—II of FIG. 1;

FIG. 3 is a fragmentary exploded perspective view of just the housing and the actuator of the first spring retainer;

FIGS. 4A and 4B are respectively side and end views of the spring of the second spring retainer;

FIGS. 5A and 5B are respectively side and end views of the actuator of the second spring retainer.

Figure 6A:
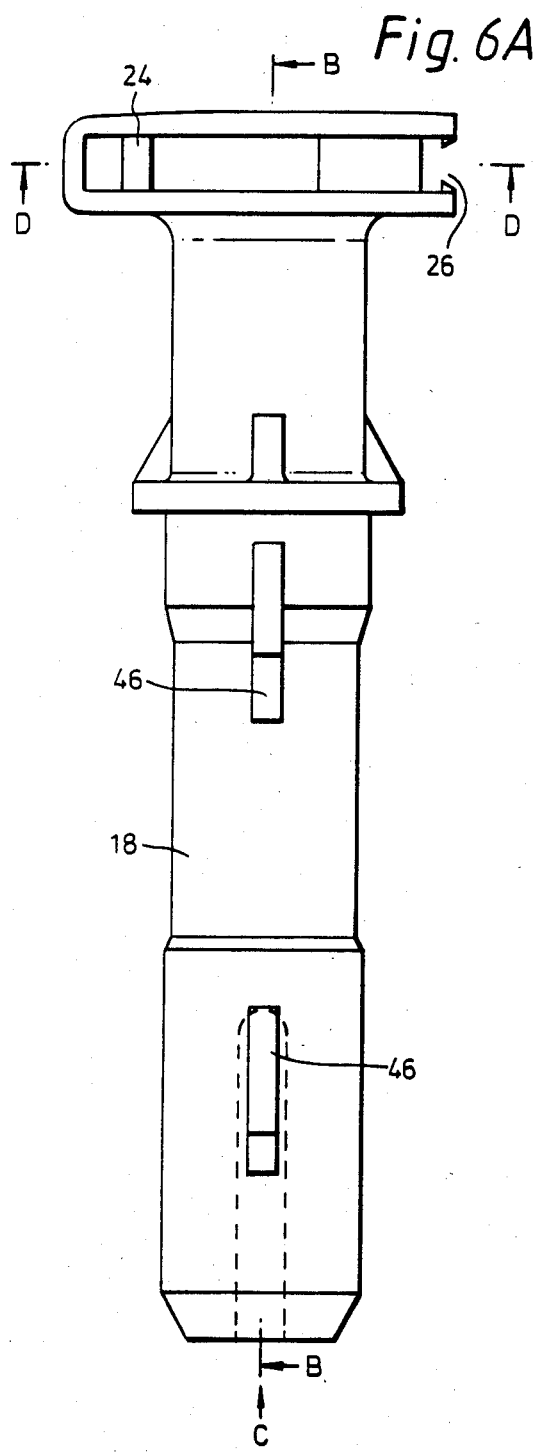
FIGS. 6A, 6B, 6C and 6D are respectively side, longitudinal cross-section, end, and transverse cross-section, views of the housing of the second spring retainer.

A first spring retainer 10 is shown in FIGS. 1 to 3 to comprise a housing 12, a spring 14 and an actuator 16.

The housing 12 is formed in one piece of the plastics material at the upper end of a tube-like socket member 18 to be fixed in normal manner to the framework (not shown) of a vehicle seat back. A bore 20 extends through both the housing 12 and the socket member 18. An opening 22 extends transversely of and intersects the bore 20 and opens to opposed curved sides of the housing 12. A post 24 spans the opening 22 in a direction parallel to the bore 20 near one of the shorter sides of the housing 12. A slot 26 extends along the entire length of the opposed shorter side of the housing 12.

The spring 14 is a pre-shaped metal strip and is laid on one edge in its natural uncompressed state within the opening 22.

The actuator 16 is again formed in one piece of a plastics material. The actuator 16 may be regarded as including a first arm 28 and a second arm 30 joined at adjacent ends thereof by a bridge 32. The bridge 32 is formed along its entire length with a headed strip 34 which in assembly is snap-engaged in the slot 26 formed in the housing 12.

The first arm 28 is then manipulated to a position in which the post 24 snap-engages with a recess 36 formed in a tongue 38 forming part of the first arm 28. Similarly, the second arm 30 is manipulated to a position in which a stop 40 on a latch 42 forming part of the second arm 30 has been moved past the post 24.

As shown in FIG. 1, the spring 14 is slightly compressed and acts to maintain the stop 40 in engagement with the post 24, with an intermediate portion of the spring 14 extending across the bore 20.

The manner of operation of the spring retainer will be apparent from the foregoing description. However, it should be emphasised that, even when partially obscured by padded upholstery, the first and second arms 28 and 30 can easily be squeezed to move the spring 14 out of the bore 20, thereby releasing a spigot (not shown) of a head rest for adjustment or removal.

A second spring retainer is shown in the remaining Figures, and is so similar to the first spring retainer that the same reference numerals will be used.

Figure 6B:
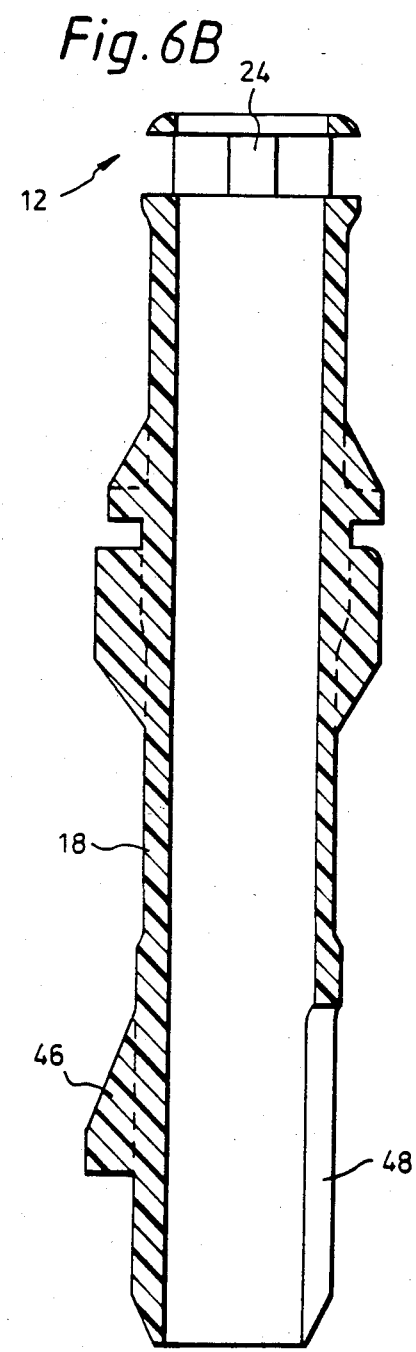
Figure 6C:
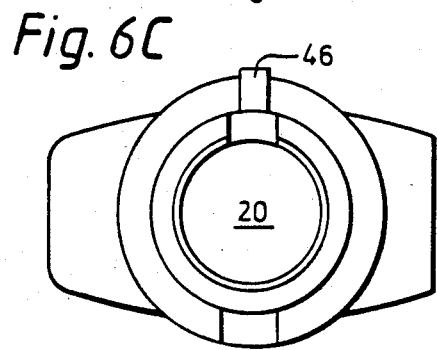
Figure 6D:
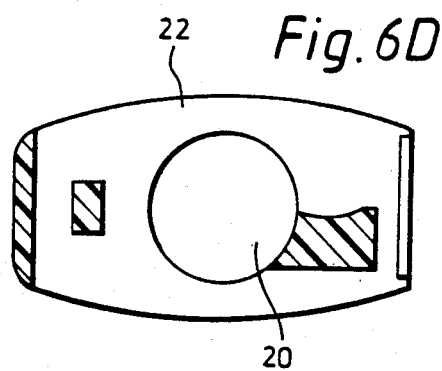

There are slight differences, however, which will now be listed. That end of the spring 14 for contacting the second arm is not looped, as is clear from FIG. 4A with FIG. 4B being an end view taken in the direction of arrow X of FIG. 4A. The second arm 30 of the actuator 16 is formed with a curved recess 44, and the free end of the tongue 38 of the first arm 28 is flattened, as is clear from FIG. 5A with FIG. 5B being an end view taken in the direction of arrow Y of FIG. 5A. The housing 12 is in fact the same as that previously described but barbs 46 and slot 48 for use in fixing to the framework of a vehicle seat back have been shown on the socket member 18. FIG. 6B is taken along the line B—B, FIG. 6C is taken in the direction of the arrow C, and FIG. 6D is taken along the line D—D, of the housing 12 of FIG. 6A.

It will be appreciated that various other modifications are possible—for example, part of the material of the tongue 38 may be removed as shown in dotted lines at 50 in FIG. 1 to allow the first arm 28 to be moved into and out of the opening 22 in the same manner as the second arm 30.

I claim:

1. A spring retainer comprising: a hollow elongated housing with a flange integral with said housing at one end thereof having a centrally disposed aperture coaxial with the aperture of said hollow housing, said flange having a transverse slot which intersects said aperture and extends through said flange, said slot being defined by top, bottom and at least one side wall, an actuator contained within said slot having first and second arm members hingedly connected at one of their respective ends to a bridge member, said first arm member having a means for affixing to said housing on its opposite end, said second arm member having a resilient retaining means on its opposite end for affixing said actuator to said housing, said retaining means of said second arm member having first and second positions, a spring having a flexed and an unflexed position being supported between said first and second arm members and having a portion which extends across said centrally disposed aperture when said spring is in its unflexed position and said second arm member is in its first position said portion of said spring being retracted outside of said centrally disposed aperture when said spring is in its flexed position and said second arm is in its second position.

2. A spring retainer according to claim 1, in which the housing is formed in one piece of a plastics material, the spring is formed as a pre-shaped metal strip, and the actuator is again formed in one piece of a plastics material.

3. A spring retainer according to claim 1, in which the housing is formed at one end of a tube-like socket member provided with mounting means for use in fixing to a framework.

4. A spring retainer according to claim 1, in which the bridge of the actuator is connected with the housing.

5. A spring retainer according to claim 4, in which the bridge is formed with an inwardly projecting headed strip and the housing is formed with a complementary groove or slot.

* * * * *